United States Patent [19]
Kallenbach et al.

[11] Patent Number: 6,045,224
[45] Date of Patent: Apr. 4, 2000

[54] VISUAL ENTERTAINMENT EYEWEAR SYSTEM AND APPARATUS THEREFOR

[76] Inventors: Neville R. Kallenbach, 1 Washington Sq. Village-#10E; Victor N. Morozov, 14 Washington Pl.-#3K, both of New York, N.Y. 10003

[21] Appl. No.: 08/841,157

[22] Filed: Apr. 29, 1997

[51] Int. Cl.[7] .................................................. G02C 1/00
[52] U.S. Cl. ............................................. 351/158; 351/41
[58] Field of Search .............................. 351/158, 41, 49, 351/51, 52, 44, 45, 46; 600/27, 28, 26

[56] References Cited

U.S. PATENT DOCUMENTS

| | | |
|---|---|---|
| 3,245,315 | 4/1966 | Marks et al. . |
| 3,612,651 | 10/1971 | McCurdy . |
| 4,315,502 | 2/1982 | Gorges . |
| 4,892,106 | 1/1990 | Gleeson, III . |
| 4,902,274 | 2/1990 | Gleeson, III . |
| 5,149,317 | 9/1992 | Robinson . |
| 5,276,539 | 1/1994 | Humphrey . |
| 5,409,445 | 4/1995 | Rubins . |
| 5,518,497 | 5/1996 | Widjaja et al. . |
| 5,709,645 | 1/1998 | Siever ........................................ 600/27 |

*Primary Examiner*—Huang Xuan Dang
*Attorney, Agent, or Firm*—Whitham Breed Abbott & Morgan LLP

[57] ABSTRACT

Eyewear which provides a visual stimulation to the wearer while permitting the wearer to maintain a degree of normal sight. The eyewear may include a frame securing a first viewing zone which is responsive to an external signal for modulation of a visual characteristic thereof and a second viewing zone which permits the wearer to maintain a degree of normal sight through that zone. Alternatively, a single zone is responsive to an external signal while nevertheless permitting the wearer to maintain an degree of normal sight.

28 Claims, 3 Drawing Sheets

VISUAL ENTERTAINMENT EYEWEAR SYSTEM AND APPARATUS THEREFOR

BACKGROUND OF THE INVENTION

The invention relates broadly to eyewear which includes a visual entertainment system for the wearer. More specifically, the invention relates to a partial see-through lens which provides artificial visual stimulation in response to an external signal while permitting the wearer to maintain a degree of normal sight. The external signal modulates a visual characteristic of the partial see-through lens.

Many devices and instruments have been proposed to stimulate visual patterns in accordance with a time varying signal derived from an audio source. Such devices provide, for example, pulsating light flashes in response to an audio source to attract people to discotheques. Also, light organs have been proposed which modulate the intensity and/or flicker rate of colored lights according to a musical program. Most of these devices alter the appearance of a room or space by varying the color, intensity or location of lights as the audio signal is generated by live or recorded music. The impact of coupling a visual signal to the music is perceived as enhancing the intensity of the overall audio experience.

It has also been proposed that visual and audio information be coupled, e.g. the pulsation of fluorescent, LED or incandescent light sources in response to an audio signal, wherein the user's (subject's) overall vision is blocked by the generated visual effect. With such devices, the user is precluded from engaging in other activities that demand some degree of attention.

Portable tape, radio or CD players allow the user to respond individually to a musical or audio experience while simultaneously maintaining normal sight to engage in unrelated activities such as walking, jogging, cycling, etc. The user is not confined to a particular location to enjoy the audio experience. The portable players provide listening privacy to the user without eliminating or restricting his or her ability to engage in other activities. It would be desirable to provide eyewear which provides visual or audiovisual stimulation in response to an external signal while maintaining a degree of the wearer's normal sight so as to permit the wearer to engage in other activities.

OBJECTS OF THE INVENTION

It is a primary object of the invention to provide a partial see-through lens that provides artificial visual stimulation to a person viewing through the lens while maintaining a degree of the viewer's normal sight.

A further and related object of this invention is to provide eyewear which is capable of furnishing artificial visual stimulation to the wearer, e.g. a form of entertainment, while permitting the wearer to maintain a degree of normal sight.

Various other objects, advantages and features of the present invention will become readily apparent from the ensuing detailed description.

SUMMARY OF THE INVENTION

A partial see-through lens provides artificial visual stimulation to a viewer while permitting the viewer to maintain a degree of normal sight. The partial see-through lens comprises first and second viewing zones. The first viewing zone includes means responsive to an external signal for modulation of a visual characteristic of the first zone to thereby provide artificial visual stimulation to the viewer and the second viewing zone permits the viewer to maintain a degree of normal sight.

In accordance with another aspect of the invention, the eyewear comprises an entertainment system which provides entertainment or other artificial visual stimulation to the wearer while permitting the wearer to maintain a degree of normal sight. Any visual effect which is perceived by the user may be modulated. The eyewear includes a frame for securing first and second viewing zones. The first viewing zone includes means responsive to an external signal for modulation of a visual characteristic of the first viewing zone and a second viewing zone through which the wearer maintains a degree of normal sight. In a preferred embodiment, the external signal is an audio signal which provides an audiovisual stimulation.

Another embodiment of the invention is a visual entertainment system adapted to be worn by a user. It comprises a pair of goggles including two lenses each having a peripheral area surrounding a central transparent area. Each lens is secured to a frame. An electrical signal generator supplies an electrical signal for modulation of a visual characteristic of the peripheral area. The user maintains a degree of normal sight through the central transparent area.

Another embodiment comprises a visual entertainment system which generates see-through images on the lens in response to an external signal to provide artificial stimulation to the wearer while permitting the wearer to maintain a degree of normal sight through the lens.

BRIEF DESCRIPTION OF THE DRAWINGS

The following detailed description, given by way of example, and not intended to limit the invention, will best be understood by reference to the accompanying drawings in which.

DETAILED DESCRIPTION OF PREFERRED EMBODIMENTS

Figure 1:
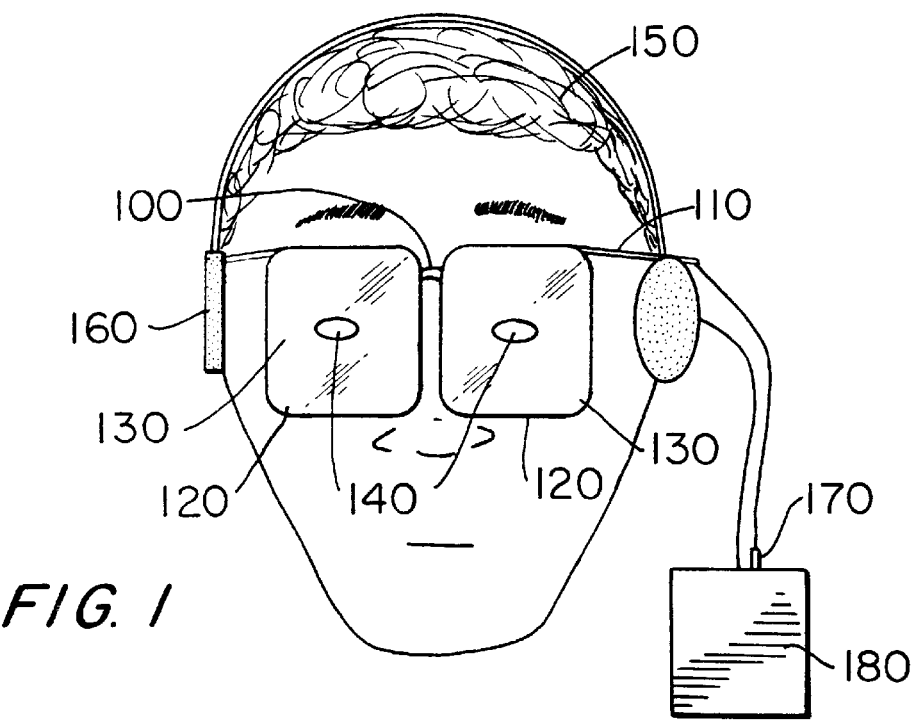
FIG. 1 is a schematic representation illustrating eyewear incorporating the entertainment system of the invention.

Referring to FIG. 1, Frame 110 secures a pair of partial see-through lenses 120 so as to form a pair of goggles 100. Each lens includes a first viewing zone 130 and a second viewing zone 140. Frame 110 may alternatively secure only one partial see-through lens 120 so as to form a single goggle.

The electrical signal consisting of a sequence of pulses, preferably a time varying signal such as an audio signal, is provided by a radio, tape player, CD player, an audio system, or other external signal source 180. The invention may be used with virtually all portable players, including portable tape, radio and CD players.

Frame 110 is connected to the audio outlet (port) of the external signal source. For example, a plug 170 emanating from frame 110 is inserted into the headphone jack of the portable tape player. Preferably, the external signal source 180 is portable to permit a wearer 150 to engage in other activities while listening to the reproduced audio signal.

Alternatively, the eyewear may include a receiver (not shown) for receiving audio signals in a wireless mode or an electrical signal generator (not shown) for generating a time varying electrical signal internally within the eyewear.

The electrical signal modulates one or more of the following modalities (visual characteristics) of the first viewing zone 130: the absorption level, refractive index, color of the light, direction of the light, intensity of the light, fluorescence, phase of the light, polarization of the light and birefringence. As shown in FIG. 1, the transparency of the second viewing zone 140 is preserved by inhibiting the modulation of the visual characteristic of the second viewing zone 140. Alternatively, the second viewing zone 140 may represent a discrete clear lens which is not subject to modulation or a hole in lens 120 where no modulation can occur.

The eyewear may also include earphones 160 to provide audiovisual stimulation to the wearer 150. The earphones 160 contain conventional circuitry (not shown) for amplifying and rectifying the audio signal.

In one embodiment, the first viewing zone 130 of lens 120 is comprised of mirrors. A small time dependent change in the apparent position of the images at the periphery of the user's visual field is induced by electro-mechanically vibrating the mirrors in response to the audio signal to provide visual or audiovisual stimulation to wearer 150 (FIG. 1) while permitting wearer 150 to maintain a degree of normal sight through second viewing zone 140 of lens 120. Preferably, the vibration of the mirrors is synchronized to the beat of the reproduced music as represented by the sequence of pulses in the audio signal.

Figure 4A:
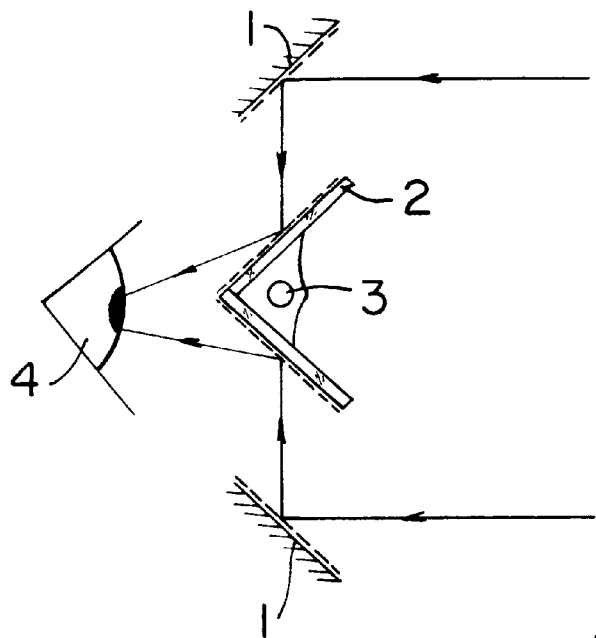
FIGS. 4A–4B are schematic representations of an example of another embodiment of the invention; are

In this embodiment, the audio signal modulates the direction of the light reaching the user's eye 4 to create an illusion of a "dancing world". Referring to FIG. 4A, the first viewing zone 130 is preferably comprised of fixed mirrors 1 and a central mobile mirror 2 which are affixed to the frame of the goggles (not shown). The incident rays of light reflected from the mirrors 1 are directed into the user's eye 4 by the central mobile mirror 2. The central mobile mirror 2 is slightly rotated (i.e., 5–10 degrees) about an axis 3 in response to the audio signal. The rotation of the central mobile mirror 2 alters the direction of the incident rays of light into the user's eye 4.

Figure 4B:
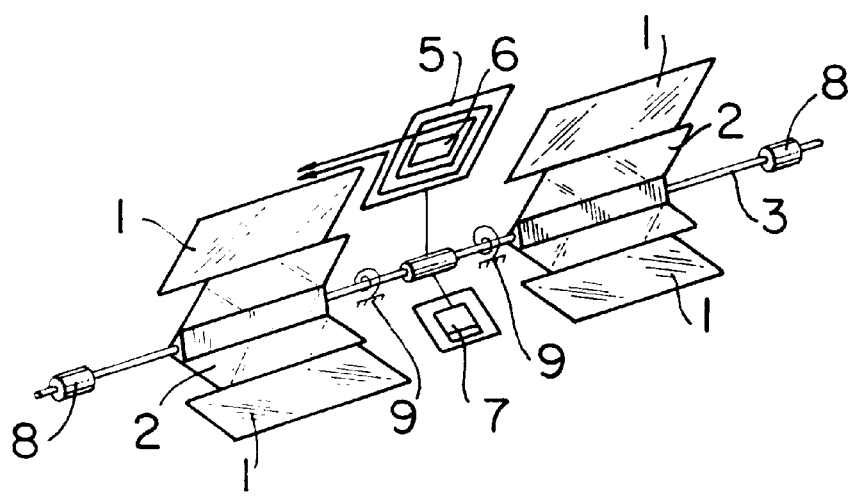

Referring to FIG. 4B (elements are denoted by the same reference numerals as in FIG. 4A), a pair of central mobile mirrors 2 are connected to a common axis 3 to synchronize the rotation of the pair of central mobile mirrors 2. The axis 3 is supported by bearings 8. An electromagnetic motor consisting of a light coil 5 and a magnet 6 rotates the pair of central mobile mirrors 2 in response to the audio signal to change the direction of the light reflected from mirrors 1. Springs 9 and a damper 7 are used to suppress excessive vibration of the central mobile mirrors 2.

Figure 4C:
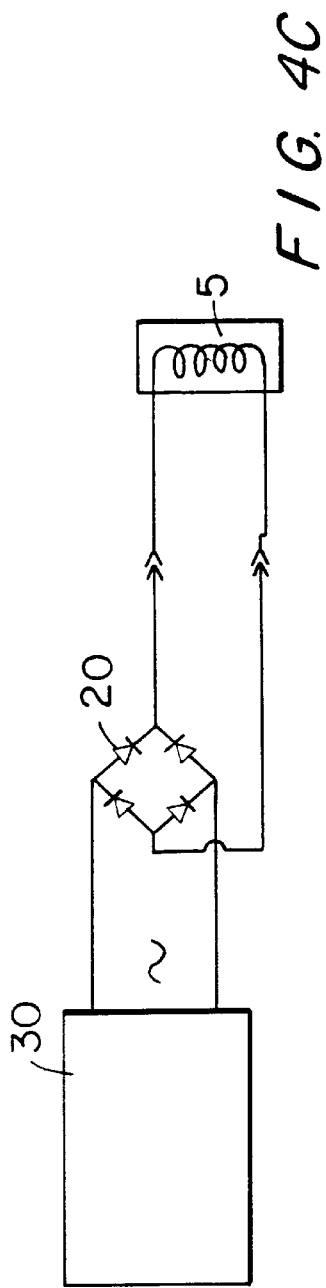
FIGS. 4C–4D are schematic representations of the electromagnetic motor for rotating the central mobil mirrors of FIG. 4B.

Preferably, the electromagnetic motor has a power consumption of 0.01–0.1 W, which can be provided by a standard output of any portable tape or CD player without affecting or significantly attenuating the audio signal. FIG. 4C illustrates one embodiment of the electromagnetic motor. The audio signal from the portable tape player 30 is rectified by a silicon diode bridge 20 and applied to the coil 5. Preferably, the coil 5 has an internal resistance of 30 ohms.

Figure 4D:
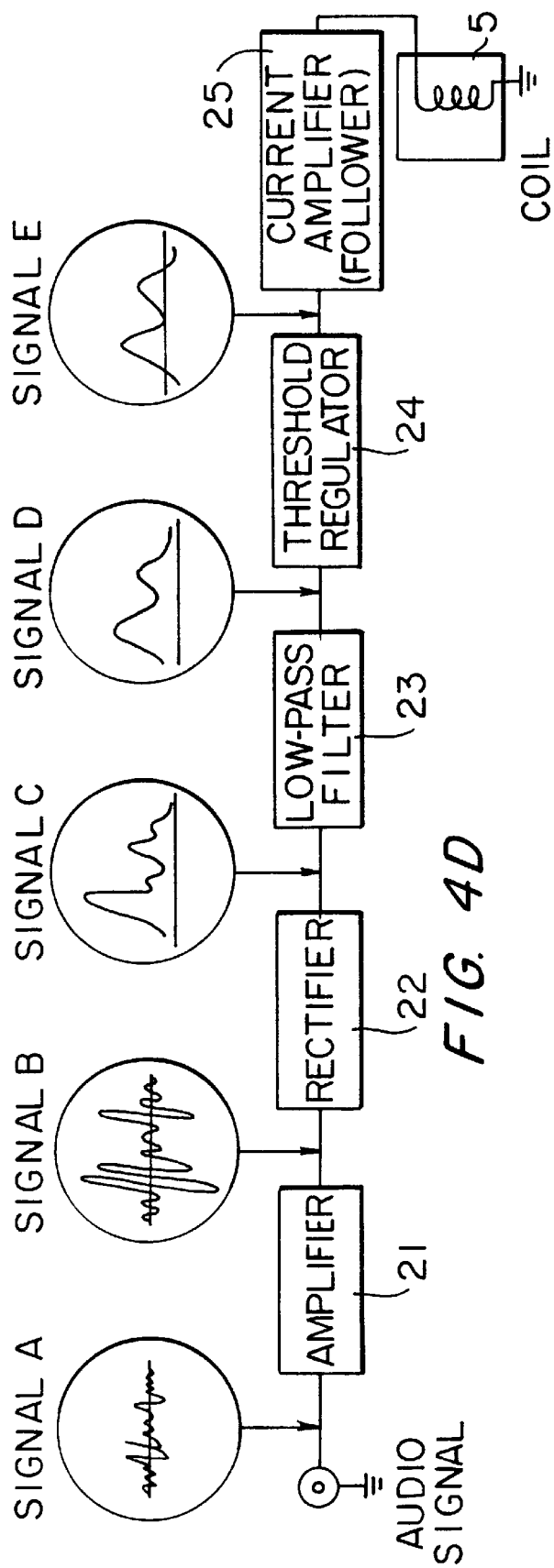

FIG. 4D illustrates another embodiment of the electromagnetic motor which transforms the audio signal into current fluctuations (variations) in the coil 5 to rotate the central mobil mirrors 2. The audio signal A is amplified by an amplifier 21 to generate an amplified signal B. As shown in FIG. 4D, the audio signal A and the amplified signal B is an alternating current (AC) signal. A rectifier 22 converts the amplified signal B from an alternating current signal to a direct current (DC) signal C. The resulting DC signal C is passed through a low-pass filter 23 which essentially removes the high frequency components therefrom. The low-pass filtered signal D is then supplied to a threshold regulator 24. The threshold regulator 24 controls the threshold of the low-pass filtered signal D to generate a fluctuating signal E. A current amplifier 25 amplifies the fluctuating signal E before supplying the fluctuating signal E to the coil 5.

This embodiment increases the power consumption of the electromagnetic motor to 0.3 W, thereby advantageously enabling a higher level of damping and use of more rigid springs 9 to precisely control the rotation of the central mobile mirrors 2. Additionally, the audio signal may be transformed and/or integrated to provide additional visual stimulation by controlling the amplification, rectification and threshold regulation of the audio signal.

Figure 2:
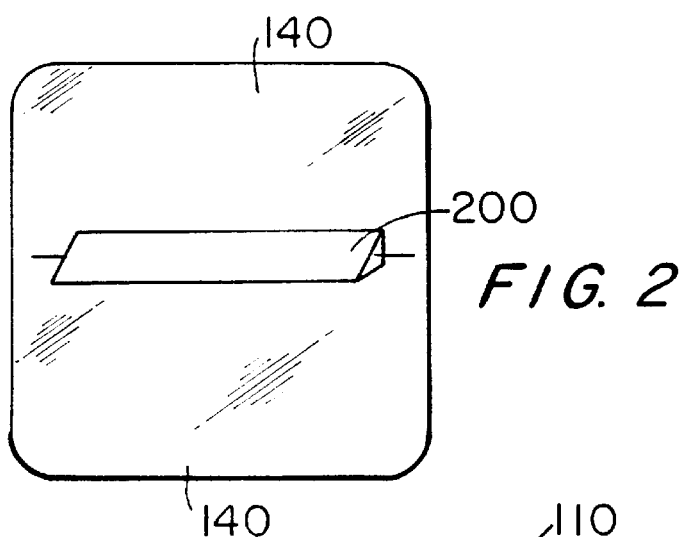
FIG. 2 is a schematic representation of an example of one embodiment of the invention.

FIG. 2 illustrates another embodiment where the first viewing zone 130 of lens 120 is comprised of a mobile gel or prism 200. The direction of the refracted light through the first viewing zone 130 is modulated by shifting the mobile gel or prism 200 in response to the audio signal to provide visual or audiovisual stimulation to wearer 150. In another embodiment, first viewing zone 130 is comprised of electronic shutters. The electronic shutters are opened and closed in response to the audio signal. In still another embodiment, a coating is applied to the first viewing zone 130. The luminescence of viewing zone 130 is modulated in response to the audio signal. In yet another embodiment, the first viewing zone 130 is comprised of liquid crystal display (LCD) or light emitting diode (LED). Time varying images are displayed in response to the audio signal. In yet still another embodiment, the first viewing zone 130 is comprised of a soft or compressible substance. A transducer may be used to modulate the refractive index of the first viewing zone 130 by changing the thickness or shape of the soft or compressible substance.

In the two zone embodiments of FIG. 1, the zones may be peripheral/central as shown or may be upper/lower, lower/upper, side-by-side or in any other suitable disposition with respect to one another. While it is difficult to quantify the degree of normal vision preserved, and that degree will in turn be a function of the desired end use of the eyewear, preferably a significant percentage of the wearers vision should be preserved. At least about ten percent of the total lens area should be unmodulated by the external system, desirably 25% should remain unmodulated and preferably 40% or more should remain unmodulated to permit the wearer to retain a significant degree of normal vision.

Figure 3:
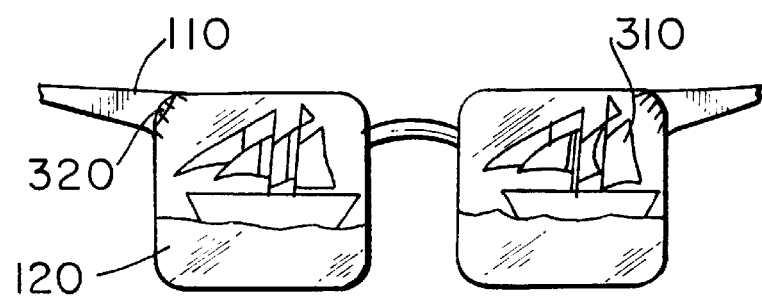
FIG. 3 is a schematic representation illustrating the eyewear incorporating another aspect of the entertainment system of the invention.

With reference to FIG. 3, (elements are denoted by the same reference numerals as in FIG. 1) frame 110 secures a pair of partial see-through lenses 120 so as to form a pair of goggles 100. Goggles 100 include a projector 320 for displaying see through images 310 on the pair of lenses 120. The see-through images 310 vary in response to the sequence of pulses in the audio signal to provide visual stimulation to the wearer.

In this embodiment the visual characteristic of the lens which is modulated should only partially impair the wearers ability to retain a degree of and preferably a significant degree of normal sight. For example, see-through images 310 as shown must include some clear zones through which sight remains largely unimpaired.

The two zone and one zone embodiments of FIGS. 1 and 3 may be combined within the overall guidelines of the invention described above. The wearer maintains a degree of normal sight through lenses 120.

What is claimed:

1. A partial see-through viewing lens comprising a first viewing zone including means responsive to an external signal for modulation of a visual characteristic of said first zone to provide artificial visual stimulation to a viewers, and a second viewing zone through which light passes and through which the viewer can see.

2. A partial see-through lens as recited in claim 1, wherein said first and second viewing zones are formed integral with each other, and the second viewing zone is an unmodulated portion of said lens.

3. The lens of claim 1 wherein said first viewing zone transmits light therethrough to be seen by the viewer, said modulation of the visual characteristic of the first viewing zone modulating a characteristic of the light passing through said first viewing zone so as to provide said visual stimulation to the viewer.

4. Eyewear providing an entertainment system to a wearer, said eyewear comprising:
    (a) a frame securing first and second viewing zones generally in front of an eye of the wearer;
    (b) the first viewing zone including means responsive to an external signal for modulation of a visual characteristic of said first viewing zone and
    (c) the second viewing zone permitting passage of light therethrough so that the wearer can see through the second zone, and
    said eyewear providing entertainment or other artificial visual stimulation to the wearer while permitting the wearer to see through said eyewear.

5. The eyewear of claim 4 wherein said first viewing zone transmits light therethrough to be seen by the wearer, said modulation of the visual characteristic of the first viewing zone modulating a characteristic of the light passing through said first viewing zone so as to provide said visual stimualation to the wearer.

6. A goggle providing a visual entertainment system to a wearer, said goggle comprising:
    (a) a frame; and
    (b) a lens secured by said frame and having a first viewing area that is modulated responsive to an external signal for modulation of a visual characteristic of said first area of said lens and a second area of transparency permitting light to pass therethough so that the wearer can see through said second area.

7. The goggle of claim 6 wherein said first viewing area transmits light therethrough to be seen by the wearer, said modulation of the visual characteristic of the first viewing area modulating a characteristic of the light passing through said first viewing area.

8. A visual entertainment system for by a user, said system comprising a pair of goggles including
    a frame adapted to be worn by the user;
    two lenses secured in said frame, each lens having a peripheral area surrounding a central transparent area, said peripheral area having a visual characteristic which is modulated responsive to an electrical signal, and a central transparent area through which the user can see; and
    an electrical signal generator associated with said goggles to effect the modulation of the visual characteristic of said peripheral areas of said lenses.

9. A pair of goggles as recited in claim 8, wherein the source of the electrical signal is an audio system.

10. A pair of goggles as recited in claim 8, wherein said electrical signal modulates absorption level of said peripheral areas.

11. A pair of goggles as recited in claim 8, wherein said electrical signal modulates the refractive index of said peripheral areas.

12. A pair of goggles as recited in claim 8, wherein said electrical signal modulates the direction of the light passing through said peripheral areas.

13. A pair of goggles as recited in claim 8, wherein said electrical signal modulates the frequency of the light passing through said peripheral areas.

14. A pair of goggles as recited in claim 8, wherein said electrical signal modulates the intensity of the light passing through said peripheral areas.

15. A pair of goggles as recited in claim 8, wherein said electrical signal modulates the phase of the light passing through said peripheral areas.

16. A pair of goggles as recited in claim 8, wherein said electrical signal modulates polarization of the light through said peripheral areas.

17. A pair of goggles as recited in claim 8, wherein said electrical signal modulates the fluorescence of said peripheral areas.

18. A pair of goggles as recited in claim 8, wherein said electrical signal modulates the birefringence of said peripheral areas.

19. A pair of goggles as recited in claim 8, wherein said central transparent area of each of said lens is an unmodulated portion of said lens or a portion defining a hole in said lens.

20. The system of claim 8 wherein said peripheral areas each transmit light therethrough to be seen by the user, said modulation of the visual characteristic of the peripheral areas modulating a characteristic of the light passing therethrough.

21. Eyewear providing a visual entertainment system for a wearer, said eyewear comprising:
    a lens having a surface; and
    means for generating images on said surface of said lens in response to an external signal, said images permitting light to pass therethrough so as to provide artificial visual stimulation to the wearer while permitting the wearer to see through said lens.

22. Visual entertainment eyewear for a user, said eyewear comprising:
    a support frame structure adapted to be worn by the user;
    the frame structure supporting a viewing portion receiving light from the surrounding environment and transmitting said light to the eye of the user so that the user can see;
    the viewing portion including means for modulating an optical characteristic of the viewing portion, the modulation of the optical characteristic of the viewing portion causing modulation of an optical attribute of the light transmitted to the eye of the user;
    control means for generating a signal being operatively associated with the means for modulating, said means for modulating varying said optical characteristic of the viewing portion responsive to variation in the signal, thereby providing time-varying changes in the optical attribute of the light seen by the user.

23. The eyewear of claim 22, wherein the viewing portion includes a mirror supported for reciprocal movement relative to the support frame, said means for modulating moving said mirror, and said modulated optical attribute of the transmitted light including the angle at which said light is transmitted to the eye of the user.

24. The eyewear of claim 22 wherein said viewing portion includes a lens through which the transmitted light passes, said means for modulating the optical characteristic of the viewing portion modulating a characteristic of transmission of the light through the lens.

25. The eyewear of claim 24 wherein the lens includes first and second viewing zones through which the user can see, said first viewing zone having an optical characteristic that changes responsive to modulation by said means for modulating, said second viewing zone remaining substantially unchanged optically while the optical characteristic of the first viewing zone is modulated.

26. The eyewear of claim 25 wherein the unchanging second viewing zone is located in a center portion of the lens and the modulated first viewing zone is located generally radially outward therefrom of the lens.

27. The eyewear of claim 26 wherein the modulated optical characteristic of the first viewing zone is the reduction of intensity of light transmitted through the lens.

28. The eyewear of claim 24 wherein the modulated optical characteristic of the first viewing zone is the reduction of intensity of light transmitted through the lens.

* * * * *